United States Patent
Imamura et al.

(10) Patent No.: US 7,656,081 B2
(45) Date of Patent: Feb. 2, 2010

(54) IMAGING DEVICE WITH SPECIFIC PHOSPHOR

(75) Inventors: Shin Imamura, Kokubunji (JP);
Masaaki Komatsu, Kodaira (JP);
Hidetsugu Matsukiyo, Chiba (JP);
Masatoshi Shiiki, Musashimurayama (JP)

(73) Assignee: Hitachi Displays, Ltd., Chiba (JP)

( * ) Notice: Subject to any disclaimer, the term of this patent is extended or adjusted under 35 U.S.C. 154(b) by 652 days.

(21) Appl. No.: 11/442,353

(22) Filed: May 30, 2006

(65) Prior Publication Data

US 2006/0267474 A1 Nov. 30, 2006

(30) Foreign Application Priority Data

May 31, 2005 (JP) .............................. 2005-158357

(51) Int. Cl.
*H01J 29/10* (2006.01)

(52) U.S. Cl. ....................................... 313/467; 313/486

(58) Field of Classification Search .................. 313/467, 313/486, 635
See application file for complete search history.

(56) References Cited

FOREIGN PATENT DOCUMENTS

| JP | 56-167783 | 12/1981 |
|----|-----------|---------|
| JP | 62-260885 | 11/1987 |
| JP | 02-289679 | 11/1990 |
| JP | 2003-115481 | 4/2003 |

*Primary Examiner*—Vip Patel
(74) *Attorney, Agent, or Firm*—Antonelli, Terry, Stout & Kraus, LLP.

(57) ABSTRACT

To provide an imaging device that shows high resolution and high luminance and produces good-quality images, an imaging device includes phosphor layer having a thickness of 40 μm or less and containing a phosphor having a composition represented by chemical formula: $Y_{2-x-y}Tb_xSc_ySiO_5$, wherein "x" and "y" are atomic ratios and satisfy the following conditions: $0<x\leqq1$ and $0<y\leqq1$. The phosphor preferably has a strongest diffraction peak at diffraction angle $2\theta$ of 30.65° to 30.9° in X-ray diffraction for better properties. The phosphor can be prepared by firing a mixture of a compound containing Y, Sc, and Tb with a compound containing Si.

22 Claims, 14 Drawing Sheets

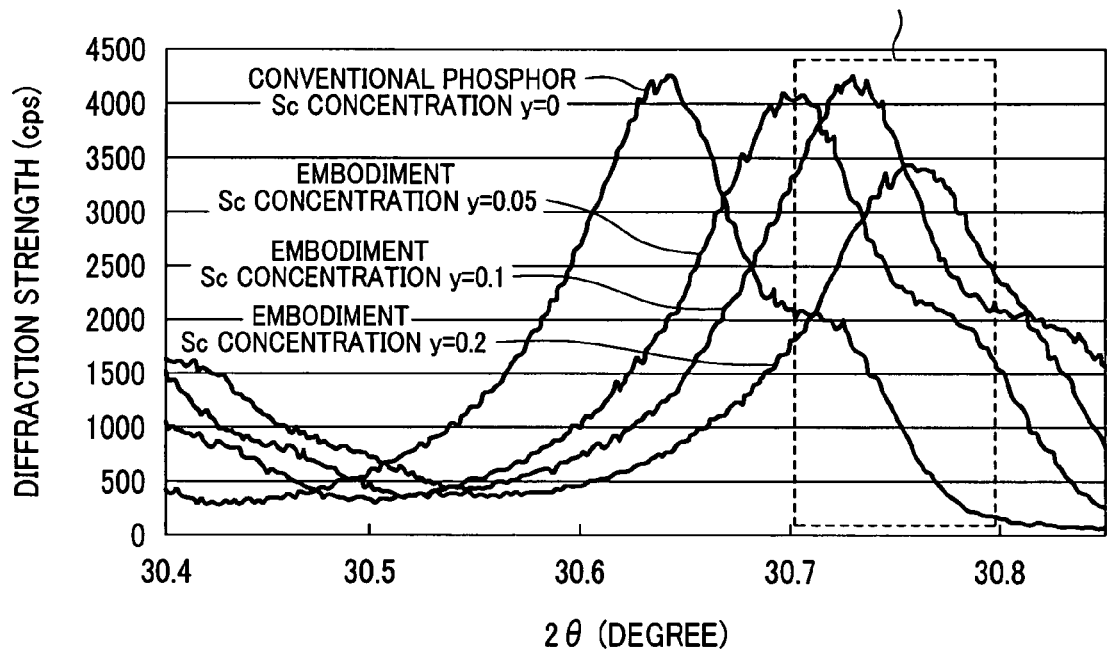
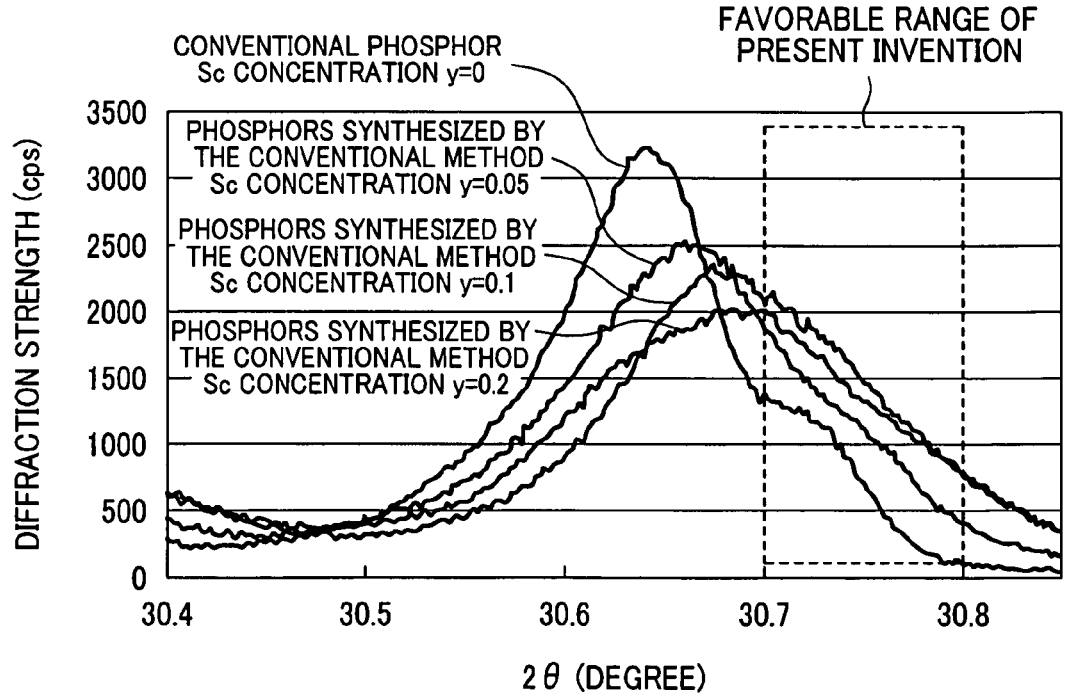

FIG.11
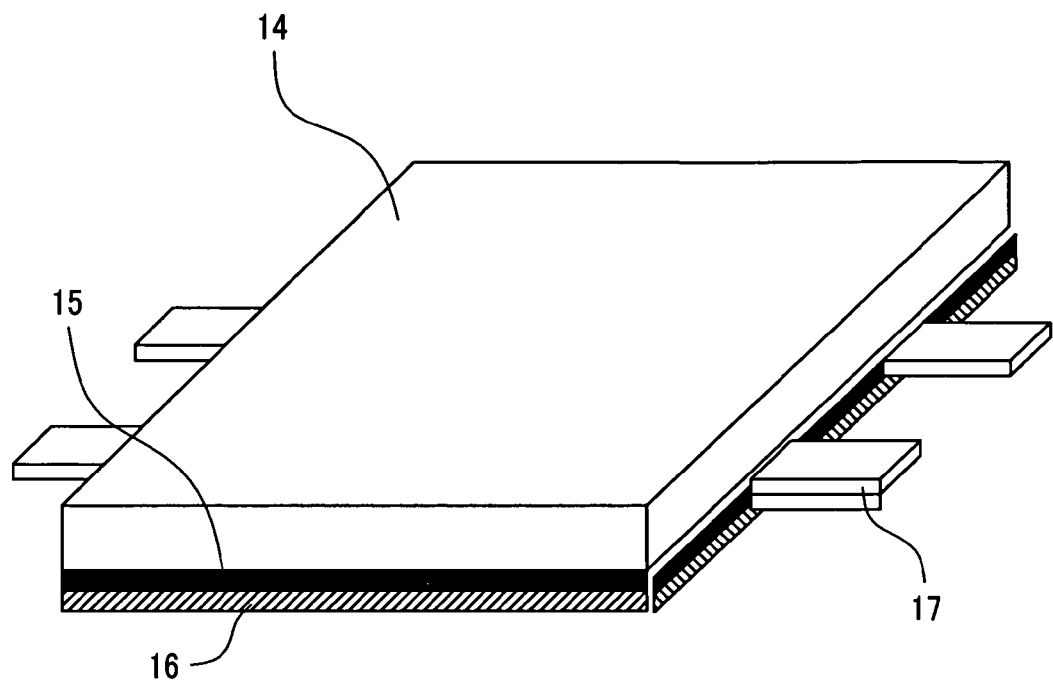
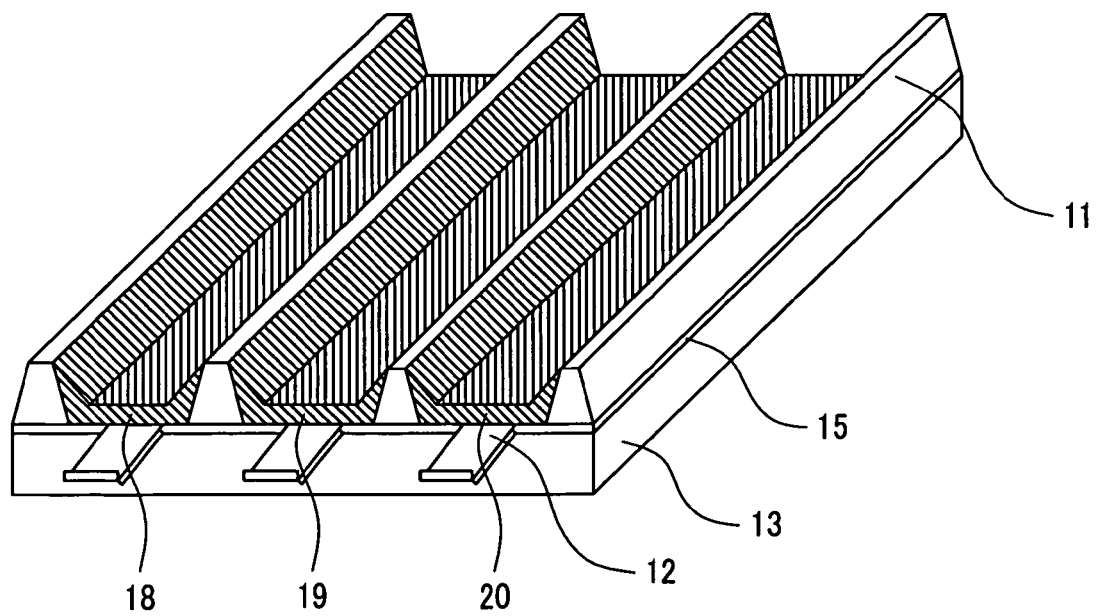

IMAGING DEVICE WITH SPECIFIC PHOSPHOR

CLAIM OF PRIORITY

The present application claims priority from Japanese application JP 2005-158357 filed on May 31, 2005, the content of which is hereby incorporated by reference into this application.

BACKGROUND OF THE INVENTION

1. Field of the Invention

The present invention relates to imaging. More specifically, it relates to imaging devices that have phosphor layers showing high resolution and high luminance and being typically suitable for projection cathode-ray tubes.

2. Description of the Related Art

Imaging devices discussed herein are those for imaging based on image data through light emission in such a way that phosphors are excited by irradiation of electron beams or ultraviolet rays. Examples thereof are cathode-ray tubes (especially, projection cathode-ray tubes), display panels using low energy electron beams, such as field-emitter displays (FEDs), and plasma display panels (PDPs). The field-emitter displays herein are displays having electron emitters arranged as a matrix and include those typically using, as the electron emitters, surface condition electron emitters (SCEs), or thin-film electron emitters such as metal-insulator-metal (MIM) electron emitters.

The imaging devices also include a system for imaging from image data which incorporates, for example, a drive for driving any tube or panel mentioned above, and image data processing circuitry. They further include non-self-luminous imaging devices each including a non-luminous display unit such as a liquid crystal display, and a light source as a backlight or sidelight, in addition to self-luminous imaging devices as above.

Higher resolution of these imaging devices has been achieved to meet the need of higher performance. For example, higher resolution of imaging devices of electron beam excitation systems is achieved by reducing the diameter of an excitation spot of electron beams, increasing the scan speed, and increasing the excitation intensity. However, this causes luminance saturation of phosphors used in the imaging devices, luminance degradation, and significant afterimages due to afterglow, resulting in a decline in image quality. In addition, better color reproduction quality in light emission is required. Therefore, phosphors must satisfy requirements in luminance and luminance degradation properties, afterglow properties and color enhancement.

Taking a projection-type cathode-ray tubes (hereinafter referred to as a projection tube) typical of the imaging devices as an example, its problems will be explained below. The cathode-ray tube controls its luminance intensity by regulating the current of excited electron beams. Thus, it is required that the luminance of phosphors linearly increases in proportion to the current. However, generally, as the excitation intensity becomes high, luminance saturation takes place, that is, the luminance runs off the linear. When an image is displayed with highly intense excitation, phosphor materials are damaged. Consequently, luminance decreases and color emission degrades during continued use of the projection tube.

The projection tube is a cathode-ray tube for use in a projection-type display and projects an image generated by the cathode-ray tube on a screen through the optics that enlarge the image area by several tens of times. Thus, excitation is performed by current of 10 to 100 times as much as a generally used direct-viewing cathode-ray tube producing non-enlarged images. Accordingly, requirements for phosphors for the projection tube are less luminance saturation especially when the tube carries a large quantity of current and less degradation when the tube carries a large quantity of current.

Among the phosphors, especially for green emitting phosphors which generate 70% of luminance in a white light, the above improvements of phosphor properties are important. Varieties of materials have so far been used for green emitting phosphors for the cathode-ray tube. An example of such phosphors is a phosphor composition expressed by chemical formula $Y_2SiO_5$:Tb. The feature of this phosphor composition is less luminance saturation when excited with high-density current and it has been generally used as a practical phosphor.

To improve the properties of this phosphor, attempts have been made to improve luminance by adding a scandium (Sc) oxide to materials and firing the mixture, as disclosed, for example, in Japanese Patent Publication No. 61-21505 and Japanese Patent Publication No. 06-62939. Improvements to luminance and suppressing luminance degradation were attempted by adding at least one of Gd, Tm, Sm, and Eu to materials and firing the mixture, as disclosed in, for example, Japanese Laid-Open No. 02-289679.

Luminance improvement was attempted by replacing a part of the composition with Mn, as disclosed in, for example, the above-mentioned Japanese Patent Publication No. 61-21505. Luminance improvement was attempted by replacing a part of the composition with Dy or Pr, as disclosed in, for example, Japanese Patent Publication No. 06-60354. Luminance degradation improvement was further attempted by using an excess of $SiO_2$ as disclosed in Japanese Laid-Open No. 2003-115481.

The conventional phosphor layers containing conventional phosphors have a thickness exceeding 40 μm so as to improve their luminance. However, the emitted light has a larger diameter (spot diameter), because the emitted light extends in the such thick phosphor layers. The resulting phosphor layers thereby fail to provide sufficient resolution. Even the above-mentioned improved phosphors show insufficient luminance that fails to meet recent requirements of higher performance. The insufficient luminance requires the application of electron beams at high current density, thereby causes coloring and decreased light emission efficiency, and invites luminance which decreases with elapse of irradiation time.

SUMMARY OF THE INVENTION

These conventional imaging devices are insufficient in low resolution. Accordingly, a main object of the present invention is to provide an imaging device using a high-resolution and high-luminance phosphor layer and producing good-quality images.

To achieve the object, the present invention provides (1) an imaging device including a phosphor layer arranged on a substrate, and an excitation device serving to apply an excitation energy to the phosphor layer based on image information, in which the phosphor layer has a thickness of 40 μm or less and at least partially contains a phosphor having a composition represented by chemical formula: $Y_{2-x-y}Ln_xSc_ySiO_5$, wherein Ln is at least one element selected from Tb and Ce; and "x" and "y" are atomic ratios and satisfy the following conditions: $0 < x \leq 1$ and $0 < y \leq 1$.

For better properties, the atomic ratio "y" in the chemical formula of the phosphor preferably satisfies the following condition: $0.09<y\leq0.3$.

The phosphor layer preferably has a thickness of 10 μm or more and 30 μm or less.

The phosphor layer more preferably has a thickness of 10 μm or more and less than 21 μm.

The atomic ratio "y" in the chemical formula of the phosphor more preferably satisfies the following condition: $0.2<y\leq0.3$.

The phosphor preferably has a strongest diffraction peak at diffraction angle 2θ of 30.65° to 30.9° in X-ray diffraction.

The phosphor more preferably has a strongest diffraction peak at diffraction angle 2θ of 30.7° to 30.8° in X-ray diffraction.

The full width at half maximum of the strongest diffraction peak of the phosphor preferably stands at diffraction angle 2θ of 0.15° or less.

Such phosphors can be prepared by mixing a compound containing at least Y, Sc, and Tb with a compound containing Si, and firing the resulting mixture.

The phosphors can also be prepared by firing a compound containing at least Y, Sc, Tb, and Si.

The phosphor layer can further contain one or more other phosphors or can be used in combination with one or more other phosphors.

The object can also be achieved by the present invention as follows.

(2) The imaging device can be an imaging device having the function of displaying color images by the action of three phosphor layers including a red emitting phosphor layer, a blue emitting phosphor layer, and a green emitting phosphor layer, in which the green emitting phosphor layer has a thickness of 40 μm or less and includes a phosphor having a composition represented by chemical formula: $Y_{2-x-y}Ln_xSc_ySiO_5$, wherein Ln is at least one element selected from Tb and Ce; and "x" and "y" are atomic ratios and satisfy the following conditions: $0<x\leq1$ and $0<y\leq1$.

(3) The imaging device can also be an imaging device having the function of displaying color images by the action of three phosphor layers including a red emitting phosphor layer, a blue emitting phosphor layer, and a green emitting phosphor layer, in which the red emitting phosphor layer at least partially includes at least one of a phosphor including $Y_2O_3$ and a phosphor including $Y_2O_2S$, the blue emitting phosphor layer at least partially includes a phosphor including ZnS, and the green emitting phosphor layer has a thickness of 40 μm or less and includes a phosphor having a composition represented by chemical formula: $Y_{2-x-y}Ln_xSc_ySiO_5$, wherein Ln is at least one element selected from Tb and Ce; and "x" and "y" are atomic ratios and satisfy the following conditions: $0<x\leq1$ and $0<y\leq1$.

(4) The imaging device can also be a projection television including a projection cathode-ray tube including the phosphor layer on its face plate, and an electron emitter serving to apply electron beams to the phosphor layer based on image information; and a screen serving to display an image projected by the projection cathode-ray tube.

(5) The imaging device can include a flat display panel containing the phosphor layer arranged on a substrate, and an excitation device serving to apply an excitation energy to the phosphor layer based on image information.

(6) The excitation device in the imaging device just mentioned above can include:

a device serving to generate plasma and including a gas discharge electrode and a rare gas to be discharged, and a device serving to apply light to the phosphor layer, the light being generated as a result of discharge of plasma generated by the plasma discharge device based on the image information.

(7) The excitation device can also include a field-emission electron emitter arranged so as to face the phosphor layer on the substrate, and a device serving to apply electron beams as the excitation energy to the phosphor layer, the electron beams being generated by the field-emission electron emitter based on the image information.

(8) The present invention further provides an imaging device as a projection color television including three projection cathode-ray tubes including a projection cathode-ray tube for red signals, a projection cathode-ray tube for green signals, and a projection cathode-ray tube for blue signals, each of the projection cathode-ray tubes including a phosphor layer on its face plate, and an electron emitter serving to apply electron beams to the phosphor layer based on image information; and a screen serving to display images projected from the projection cathode-ray tubes, in which the phosphor layer on the face plate of the projection cathode-ray tube for green signals has a thickness of 40 μm or less and includes a phosphor having a composition represented by chemical formula: $Y_{2-x-y}Ln_xSc_ySiO_5$, wherein Ln is at least one element selected from Tb and Ce; and "x" and "y" are atomic ratios and satisfy the following conditions: $0<x\leq1$ and $0<y\leq1$.

(9) The above-mentioned imaging devices are self-luminous imaging devices. In addition, excellent liquid crystal display devices showing high luminance can be achieved by using the phosphor as a backlight of non-luminous liquid crystal display devices. Specifically, the present invention further provides an imaging device including a liquid crystal panel, and a white-emitting cold cathode fluorescent lamp serving as a backlight of the liquid crystal panel, the fluorescent lamp including a phosphor layer including a red emitting phosphor, a green emitting phosphor, and a blue emitting phosphor, in which the phosphor layer has a thickness of 40 μm or less, and the green emitting phosphor includes a phosphor having a composition represented by chemical formula: $Y_{2-x-y}Ln_xSc_ySiO_5$, wherein Ln is at least one element selected from Tb and Ce; and "x" and "y" are atomic ratios and satisfy the following conditions: $0<x\leq1$ and $0<y\leq1$.

(10) The white-emitting cold cathode fluorescent lamp has a special structure different from that of regular fluorescent lamps used as light sources for lighting equipment. Specifically, regular fluorescent lamps each have a large diameter of about several centimeters to several tens of centimeters (e.g., 32 cm). In contrast, the white-emitting cold cathode fluorescent lamp for use as a backlight of liquid crystal display devices has a very small diameter of about several millimeters (e.g., 3 to 5 mm) and a long length of about several tens of centimeters (e.g., 50 to 80 cm).

Phosphors for use in the white-emitting cold cathode fluorescent lamp having such a small diameter and a large length must show high luminance and, in addition, satisfactory color purity, because light from the lamp is directly viewed in liquid crystal display devices. In contrast, light is applied to an object and the reflected light is observed in regular illumination equipment. The green emitting phosphor relating to the present invention satisfies these requirements.

The operation of the present invention will be illustrated in detail below.

According to conventional techniques, attempts were made to improve the properties of phosphors by mixing a parent material of $Y_{2-2x}SiO_5$ activated by $Tb_x$ with another material containing, for example, Gd, Sc, Yb, Eu, Sm, Tm, Mn, Dy, and/or Pr and firing the mixture to thereby replace a part of component Y with these elements.

In contrast, the phosphors for use in the present invention are synthetically prepared by mixing a compound containing at least Y, Sc, and Tb with a compound containing Si, and firing the mixture, or by firing a compound containing at least Y, Sc, Tb, and Si.

This can yield phosphors having crystals different from those of the conventional phosphors and having a composition represented by chemical formula: $Y_{2-x-y}Ln_xSc_ySiO_5$, wherein Ln is at least one element selected from Tb and Ce; and "x" and "y" are atomic ratios and satisfy the following conditions: $0<x\leqq 1$ and $0<y\leqq 1$.

In phosphors according to the above-mentioned Japanese Patent Publications No. 61-21505 and No. 06-60354, the luminance of their light emission reaches the maximum at a Sc replacing quantity of 0.09 or less. In contrast, the luminance of light emission by the phosphors relating to the present invention reaches the maximum at a higher concentration of Sc. This is because phosphors synthesized by the methods according to the present invention have novel crystal forms different from those of the conventional phosphors.

The phosphors relating to the present invention each have a Si content that agrees with the stoichiometric composition and thereby show high luminance, in contrast to the conventional phosphor described in Japanese Laid-Open No. 2003-115481.

The phosphors for use in the present invention are obtained in unrestricted form; they may be either a single crystal or polycrystal. They may be obtained inane form such as sintered solids or powders. However, powders resulting from reaction at high temperatures are often used for light emission by electron excitation typically in cathode-ray tubes. For this application, powders with a particle diameter of about 1 μm to about 20 μm are used.

The phosphor layers for use in the present invention may further contain or may be present in combination with one or more other phosphors with different compositions as a phosphor mixture. Particularly, they preferably further contain at least one phosphor such as $Y_3(Al, Ga)_5O_{12}$:Tb phosphor, $Zn_2SiO_4$:Mn phosphor, LaOCl:Tb phosphor, $InBO_3$:Tb phosphor, $LaPO_4$:Tb, Ce phosphor, $Y_2O_3$:Eu phosphor, $BaMgAl_{10}O_{17}$:Eu phosphor, and ZnS phosphor. The resulting phosphor mixture can emit higher luminance light, provide better color reproduction quality, have a different color, or have a longer lifetime.

The conventional phosphor layers must have a thickness exceeding 40 μm, for high luminance. In contrast, the phosphor layers according to the present invention can provide satisfactorily high luminance that is practically applicable, even if they have a thickness of 40 μm or less, by using the phosphors relating to the present invention. The present invention can provide imaging devices showing high resolution and high luminance by using the phosphors in a phosphor layer having a thickness of 40 μm or less.

The resulting imaging devices including phosphor layers containing the phosphor according to the present invention can produce good-quality images in practical use.

This will be explained, using a projection display as an example. The projection display includes three projection tubes that are for discrete red (R), blue (B), and green (G) colors. Phosphors that are deposited to the face plate of the green emitting projection tube preferably contain any of the phosphors relating to the present invention alone or as a green emitting phosphor mixture in combination with one or more other phosphors. This can yield an imaging device featuring a longer lifetime.

The phosphors relating to the prevent invention are also used in cathode-ray tubes for direct-viewing display (hereinafter referred to as direct-viewing tubes). Green emitting phosphors of the phosphors of three primary colors to be applied to a face plate are preferably any of the phosphors relating to the present invention alone or as a green-emitting phosphor mixture in combination with one or more other phosphors. This can yield an imaging device featuring fine green emission color, a longer lifetime, shorter afterglow, and good image quality.

It is also advisable to apply a phosphor layer comprising the phosphors relating to the present invention to an imaging device using low energy electron beams, such as a field-emitter display (abbreviated to FED). This can yield an imaging device featuring a longer lifetime.

The phosphors relating to the present invention shows high resolution and have high luminance with less luminance degradation when being excited by large current. Thus, they are most suitable for use in projection tubes and FEDs.

A phosphor layer comprising the phosphors relating to the present invention is preferably applied to an imaging device in which light emission is performed through excitation of the phosphors by ultraviolet radiation, such as a plasma display panel (PDP). This can yield an imaging device showing high resolution and high luminance.

Imaging devices featuring high resolution and high luminance can be prepared by applying the present invention to a backlight or sidelight light source of imaging devices using liquid crystals.

Further objects, features and advantages of the present invention will become apparent from the following description of the preferred embodiments with reference to the attached drawings.

BRIEF DESCRIPTION OF THE DRAWINGS

FIG. 2 is a graph showing how the X-ray diffraction peak of the phosphor in the imaging device as the embodiment of the present invention varies with a varying Sc concentration "y";

FIG. 3 is a graph showing how the X-ray diffraction peak of a phosphor in an imaging device as a comparative sample (conventional equivalent) varies with a varying Sc concentration "y";

FIG. 11 is a view schematically illustrating the structure of the plasma display panel as the further embodiment of the present invention;

Figure 1:
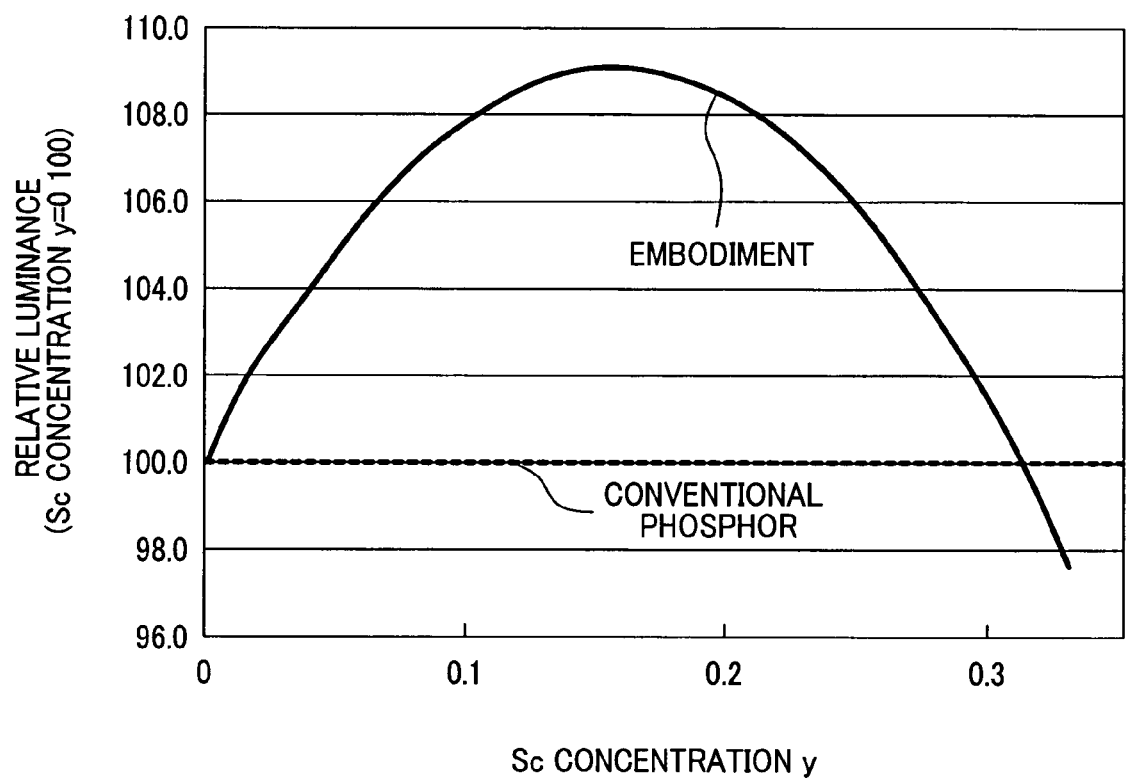
FIG. 1 shows a characteristic curve on the relationship between the Sc concentration "y" and the luminance of a phosphor in an imaging device as an embodiment of the present invention.

These drawings illustrate a face plate 1; a phosphor layer 2; a metal back 3; an electron beam gun 4; a cathode-ray tube 5 for red images; a cathode-ray tube 6 for green images; a cathode-ray tube 7 for blue images; a screen 8; lenses 9; a phosphor 10; a separating wall 11; an address electrode 12; a back substrate glass 13; a front substrate glass 14; a dielectric layer 15; a protect layer (MgO) 16; a sustain electrode 17; a green emitting phosphor layer 18; a red emitting phosphor layer 19; a blue emitting phosphor layer 20; a face plate 21; a phosphor layer 22; a rear plate 23; a cathode 24; a resistance layer 25; an insulation layer 26; a gate 27; a coned metal 28; a field emitting cathode 29; a glass tube 30; a phosphor 31; an electrode 32; a discharge medium 33; a closed box 34 (a back panel 34A and a front panel 34B); a dielectric 35; a backlight unit 36; a liquid crystal display panel 37; a flame (bottom) 38; a reflector 39; a white light source 40 (e.g., CCFL); a diffuser plate 41; a prism sheet 42; a reflective polarizer 43; an inverter 44; and a frame (upper) 45.

As is described above, the present invention can achieve the intended object. Specifically, the present invention can provide imaging devices showing high resolution and high luminance and producing high-quality images.

DESCRIPTION OF THE PREFERRED EMBODIMENTS

Preferred embodiments of the present invention will be illustrated in detail with reference to the attached drawings.

Embodiment 1

Phosphor layers for use in imaging devices having configurations according to the present invention were prepared by the following methods, and the properties thereof were evaluated.

Phosphors for use herein were synthetically prepared using a compound comprising Sc as a component as a material. The compound had been prepared typically by coprecipitation. Specifically, (Y, Sc, Tb)$_2$O$_3$ and SiO$_2$ were used as materials. Equivalent or better results were obtained by using a compound containing Y, Sc, Tb, and Si prepared typically by coprecipitation as a material.

These materials of predetermined quantities were well mixed. The resulting mixture was put in an alumina crucible and was burned at temperatures of 1400° C. or higher for two hours or longer. The burnt product was pulverized and there by yielded phosphor powders having a particle diameter of about several micrometers.

In this method, phosphors having a composition represented by Y$_{2-x-y}$Tb$_x$Sc$_y$SiO$_5$ were prepared wherein the composition was altered by varying the atomic ratios "x" and "y" within the ranges of 0<x≦1 and 0<y≦1.

A conventional phosphor as a comparative sample was prepared by the same procedure as above, except for using a material containing no Sc.

In addition, comparative samples as conventional equivalents containing Sc were also prepared by a conventional production method, in which a Sc oxide was mixed with other materials and the mixture was burnt. Specifically, (Y, Tb)$_2$O$_3$, Sc$_2$O$_3$, and SiO$_2$ were used as materials. These materials were thoroughly mixed and burnt according to the procedure as in the present invention and thereby yielded phosphor powders.

To measure the light emission properties of cathode-ray tubes using the above phosphor samples, the phosphor samples were deposited by sedimentation on a metal substrate, and a phosphor layer having a thickness of 40 μm or less was prepared. This phosphor layer was placed in a vacuum at a degree of vacuum of 10$^{-5}$ Pa or higher and irradiated with electron beams whose current density varies in the range of 0.1 to 1000 μA/cm$^2$. Luminance was then measured.

Luminance was measured by a photo transistor made of Si at a distance of 20 cm from the layer surface.

FIG. 1 shows how the luminance varies with a varying Sc concentration "y". The graph is plotted for "y" of 0.35 or less, assuming that the luminance of the conventional sample having a Sc concentration "y" of 0 is 100. FIG. 1 shows that the samples according to the present invention have luminance higher than the conventional sample at a Sc concentration exceeding 0 and have sufficiently improved luminance at a Sc concentration exceeding 0 and equal to or less than 0.3.

The results also shows the luminance is significantly improved at a Sc concentration. "y" of more than 0.09 and equal to or less than 0.23.

The samples according to the present invention also show improved luminance even at a Sc concentration "y" of more than 0.2 and equal to or less than 0.3, within which range conventional equivalents are believed not to be improved in their luminance.

The measurements of other phosphor samples with different proportions of the components, wherein the value of "x" varies in the range of 0<x≦1, showed the same results as shown in FIG. 1 when the Sc concentration "y" was varied similarly.

The Sc-containing phosphors prepared according to the conventional method did not show such improved luminance. This is because the phosphors for use in the present invention have crystals different from those prepared by the conventional method. However, the phosphor (Y$_{2-x-y}$Tb$_x$Sc$_y$SiO$_5$) has a light emission spectrum substantially similar to that of conventional equivalents, and the spectral curve thereof is omitted herein.

FIG. 2 is an enlarged view of a strongest peak in X-ray diffraction of the phosphor for use in the present invention. The X-ray measurement was performed using copper Kα characteristic X-ray. FIG. 2 demonstrates that phosphors containing Sc as a component show a peak sifted to a higher angle with an increasing Sc concentration. This shows that Sc is taken into a crystal, replaces a conventional atom, and thereby forms a novel crystal different from those of conventional equivalents containing no Sc.

FIG. 3 is an enlarged view of X-ray diffraction peaks of phosphors prepared by the conventional method. The X-ray diffraction analysis was conducted by the above procedure. FIG. 3 demonstrates that the Sc-containing phosphors do not substantially change their peak position as compared with the conventional sample containing no Sc, and that the peak intensity decrease and the peak width increases with an increasing Sc concentration. This demonstrates that Sc in the phosphors prepared by the conventional method does not replace elements in the crystal. The fact that the peak intensity decreases and the peak width increases shows that satisfactory crystals are not formed. These results demonstrate the phosphor crystals for use in the proton pump inhibitor can only be prepared by the method specified in the present invention.

Figure 4:
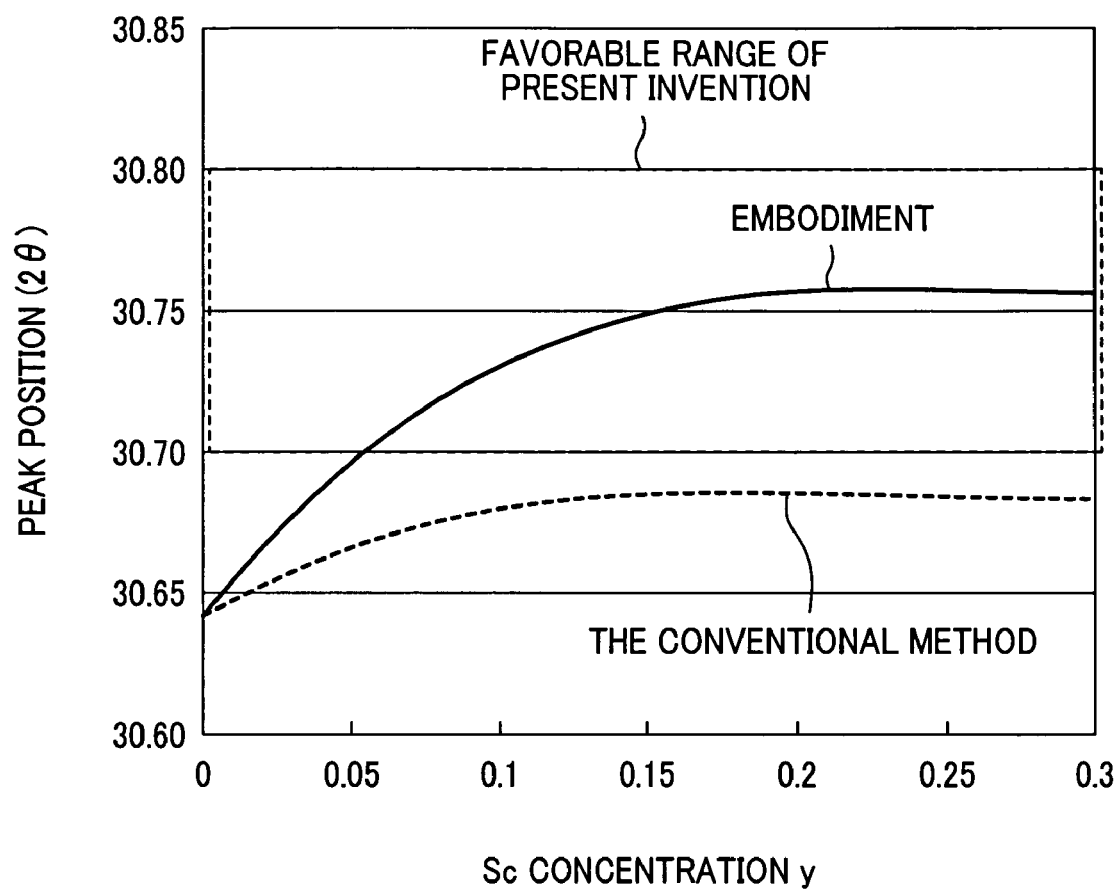
FIG. 4 is a graph showing how the position of the X-ray diffraction peak of the phosphor in the imaging device as the embodiment of the present invention shifts with a varying Sc concentration "y"

FIG. 4 shows how the peak position of the strongest X-ray diffraction peak shifts with a varying Sc concentration "y". The peak position stands at diffraction angle 2θ of 30.65° or more when Sc is added as a component. Phosphors prepared by the conventional method do not show a peak position at diffraction angle 2θ exceeding 30.70. However, the phosphors prepared by the method of the present invention show a peak position at an increasing diffraction angle 2θ of 30.70° or more with an increasing Sc concentration. These show that the crystals obtained according to the present invention differ from those prepared by the conventional method. The peak position can increase up to 2θ of about 30.9°. However, desired properties are obtained at 2θ of 30.80° or less.

Figure 5:
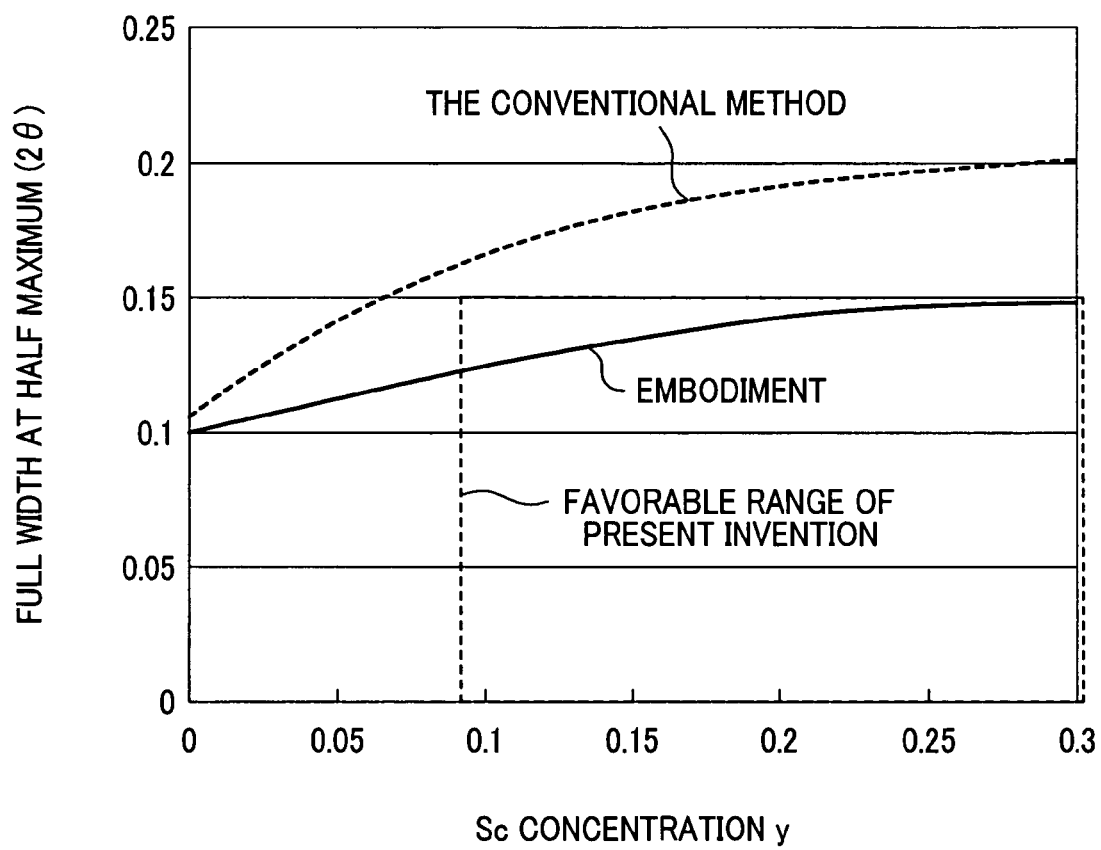
FIG. 5 is a graph showing the relationship between the Sc concentration "y" and the full width at half maximum of X-ray diffraction peak of the phosphor in the imaging device as the embodiment of the present invention.

FIG. 5 shows how the full width at half maximum of the strongest X-ray diffraction peak varies with a varying Sc concentration "y". Phosphors prepared by the conventional method show a sharply increasing full width at half maximum with an increasing Sc concentration. In contrast, phosphors according to the present invention do not show such an increasing full width at half maximum even with an increasing Sc concentration. This indicates that the crystals relating to the present invention differ from those prepared by the conventional method, as is described above. Preferred properties in the present invention can be obtained at a full width at half maximum of 0.15 degree or less.

Figure 6:
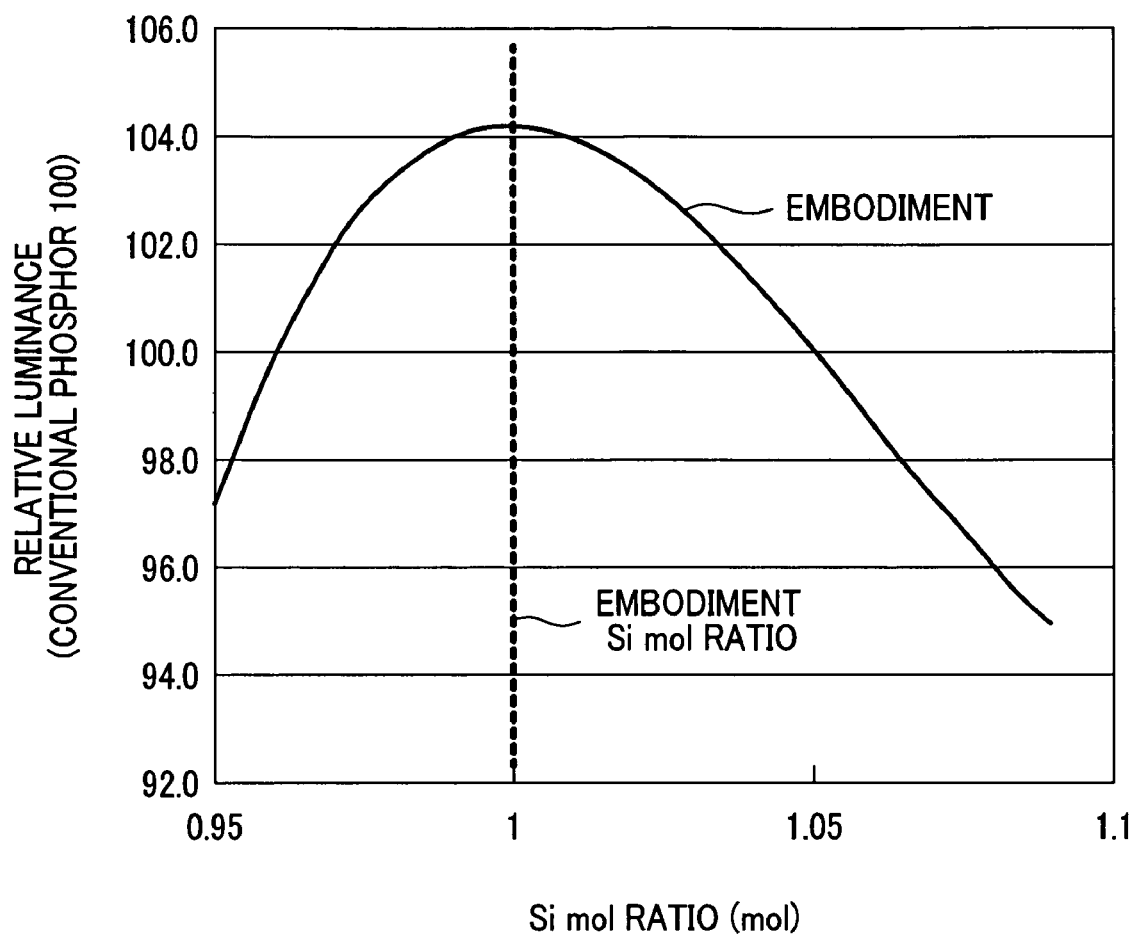
FIG. 6 is a characteristic curve showing the relationship between the Si mol ratio and the relative luminance of the phosphor in the imaging device as the embodiment of the present invention.

FIG. 6 shows how the luminance varies with a varying mol ratio of Si relative to 1 mole of the total components. FIG. 6 demonstrates that the luminance stands at maximum when the Si mol ratio is 1 mol that agrees with the stoichiometric ratio. This indicates that the Si mol ratio is preferably 1.

Measurements were also made for the properties of phosphors relating to the present invention containing Ce in addition to Tb and having a composition represented by $Y_{2-x-y}(Ce, Tb)_x Sc_y SiO_5$. As a result, further satisfactory properties were obtained.

As is described above, the present invention can provide phosphor layers having high luminance, and the phosphor layers can in turn provide imaging devices featuring high resolution and high luminance.

Embodiment 2

Imaging devices according to the present invention were prepared with a varying thickness of a phosphor layer, and the properties thereof were evaluated.

Phosphor layers for use in the imaging devices according to the present invention using the Sc-containing phosphor described in Embodiment 1 were prepared with a varying thickness of 5 to 50 μm. The phosphor layers were irradiated with electron beams, and the luminance thereof was measured by the procedure of Embodiment 1. In addition, spot diameters as an index of resolution were measured.

The "spot diameter" is the diameter of a bright, luminous point upon application of electron beams to one point. The spot diameter is generally measured while scanning the electron beams. The luminous point moving along with scanning of the electron beams was split in a moving direction, and the change of light emission intensity with time was determined. The change in light emission intensity at a position within the luminous point was determined by calculation based on the above result. In this measurement, the luminous point was assumed to be a position which shows an emission intensity of 10% of the maximum emission intensity (the center of the luminous point), and the spot diameter was defined as the distance between the center of the luminous point and the outer edge of the luminous point showing an emission intensity of 10% of the maximum.

The spot diameter relates to the sizes of pixels on a screen. The resolution of image decreases with a spot diameter at a certain level or less. The spot diameter is preferably 200 μm or less, and more preferably about 170 to 180 μm or less. It is further preferably about 150 to 160 μm or less to sufficiently meet requirements in high-resolution images such as in high-definition imaging devices.

The thickness of phosphor layers was determined by measuring the thickness of sections of phosphor layers formed on a substrate, using a scanning electron microscope. In addition, the thickness of phosphor layers was also determined from the substrate or face panel using a non-contact profile meter. Suitable values of the thickness were defined as the thickness of phosphor layers, based on these results.

Figure 7:
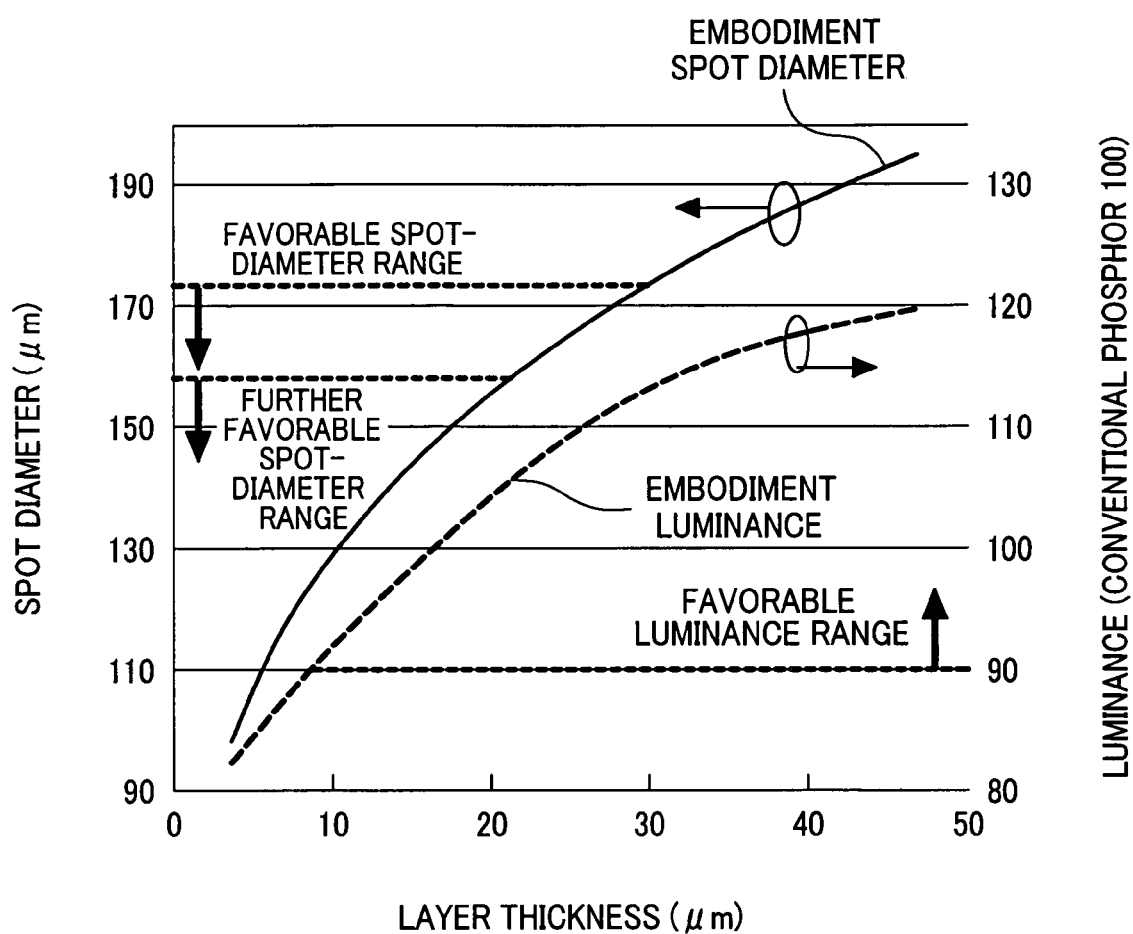
FIG. 7 is a characteristic curve showing the relationship of the thickness with the spot diameter and luminance of the phosphor in the imaging device as the embodiment of the present invention.

FIG. 7 shows how the spot diameter and luminance vary with a varying thickness of phosphor layers. FIG. 7 demonstrates that the spot diameter decreases with a decreasing thickness of phosphor layers, and that the thickness should be 40 μm or less, is preferably 30 μm or less, and more preferably less than 21 μm, for the desired spot diameter.

FIG. 7 also shows that the luminance decreases with a decreasing thickness. In this measurement, the luminance of the conventional equivalents is assumed to be about 100. For practical use, the luminance is preferably 80 or more, and more preferably 90 or more. As is shown in FIG. 7, the thickness should preferably be 10 μm or more so as to obtain relative luminance of 90 or more.

As is described above, the present invention can yield high-resolution phosphor layers, which in turn can provide imaging devices showing high resolution and high luminance.

Embodiment 3

A 18-cm projection tube for green images having a layer of the phosphors according to the present invention as a green emitting phosphor layer for image display was prepared.

Figure 8:
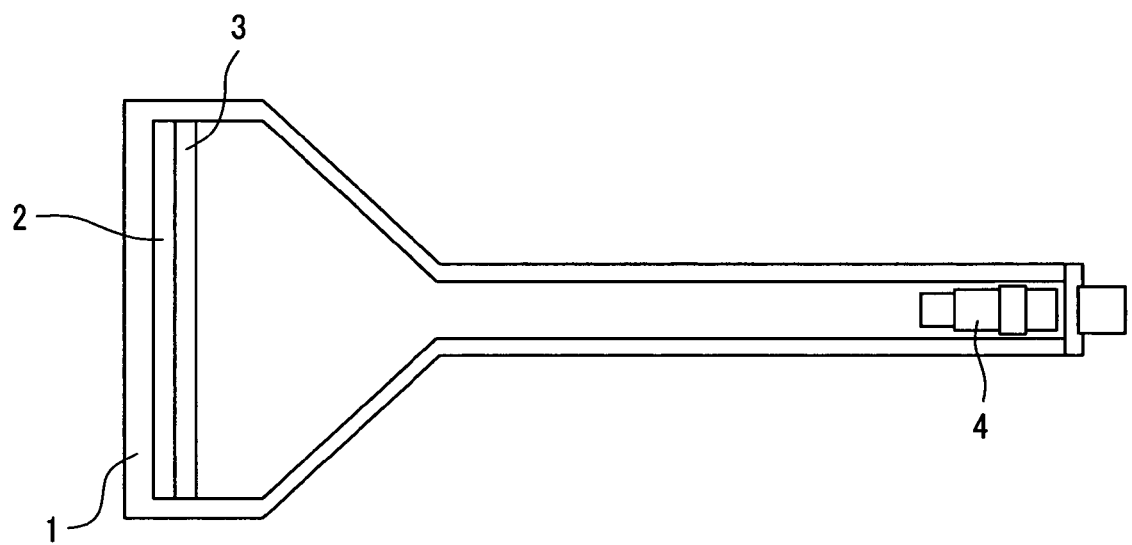
FIG. 8 is a schematic sectional view of a cathode-ray tube as another embodiment of the present invention.

FIG. 8 is a schematic sectional view of the projection tube. In FIG. 8, the projection cathode-ray tube is equipped with an electron beam gun 4 at the neck end and has a phosphor layer 2 and a metal back 3 fit onto the inside of a face plate 1. The phosphor layer 2 of the projection tube comprises a monochrome layer. The phosphor layer 2 was prepared by sedimentation of the phosphor according to the present invention, in a 7-inch valve. After filming and aluminum evaporation on the back surface, the electron beam gun and other parts were attached. The projection tube for green images was completed by degassing and sealing The phosphor layer in the cathode-ray tube in area of 102 mm long 76 mm wide were excited according to TV scanning by being irradiated with 0.1- to 10-mA cathode rays at a voltage of 30 kV. The light emission properties thereof were determined in the following manner.

The luminance was measured at a distance of several tens of centimeters using a luminance meter. The spot diameter was also measured by the procedure in Embodiment 2.

These results show that the cathode-ray tubes prepared according to the present invention show higher resolution than conventional equivalents and show luminance properties equal to or higher than the conventional equivalents. Specifically, the present invention provides imaging devices showing high resolution and high luminance and producing high-quality images.

Embodiment 4

A projection television imaging device having a layer of the phosphors according to the present invention as a green emitting layer for image display was prepared.

Initially, a 18-cm projection tube for green images according to the present invention was prepared by the procedure of Embodiment 3. The projection television imaging device was then prepared using the 18-cm projection tube for green images in combination with a projection tube for red images and a projection tube for blue images.

Figure 9:
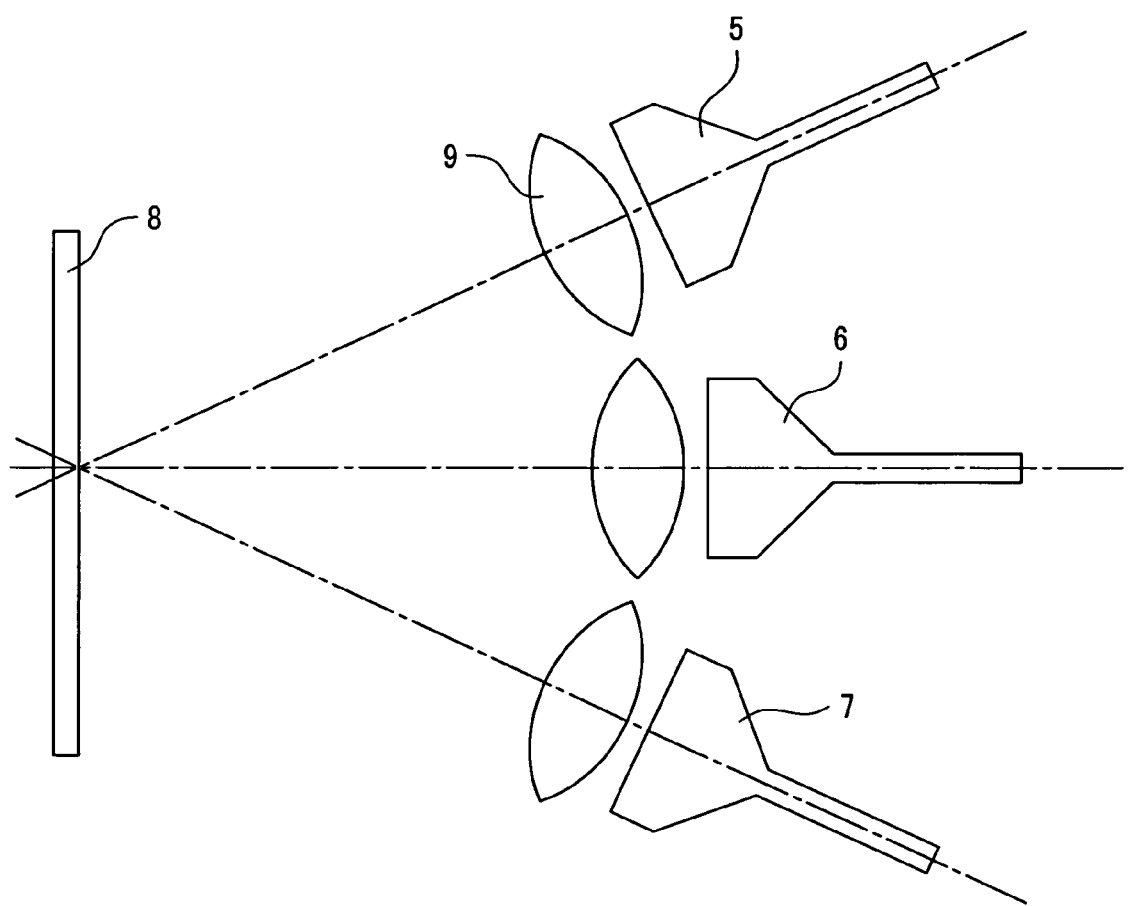
FIG. 9 is a schematic illustration of a projection television imaging device as yet another embodiment of the present invention.

FIG. 9 is a schematic diagram of the projection television imaging device according to the present invention. FIG. 9 illustrates a cathode-ray tube for red images 5, a cathode-ray tube 6 for green images according to the present invention, a cathode-ray tube 7 for blue images, and a screen 8 arranged at predetermined distances so as to face these tubes. Lenses 9 are located between the screen and the projection tubes, aligned with the axis of each tube. A monochromatic image reproduced on the face plate of each projection tube is converged and enlarged through lenses and projected on the screen 8. Three colors reproduced by the tubes are combined into a color image on the screen.

Actually, the projection television imaging device comprises an image reproducing portion including a TV tuner, cathode-ray tube drive circuits, and image signal processing circuitry, an audio portion including speakers and amplifiers, operating mechanisms such as switches and volumes, and a cabinet for housing all parts, support frames, and a pedestal, in addition to the above cathode-ray tubes for each color images, screen, and lenses.

Measurements were made for the light emission properties of the projection television imaging device of Embodiment 4 in methods as will be described below. Luminance was measured by a luminance meter from the point at a distance of several tens of centimeters. Assuming the luminance of the current standard product of the same device in conventional use to be 100, the luminance measurements were represented in relative luminance. All measurements were made under the conditions that the phosphor layer in area of 102 mm long and 76 mm wide is excited by being irradiated with 0.1- to 10-mA cathode rays at a voltage of 30 kV.

The phosphor emission color was measured by a chromaticity meter from the point at a distance of several tens of centimeters. Emission color comparison was made in terms of "y" values of chromaticity on the x-y chromaticity coordinates.

The device properties with regard to luminance degradation were evaluated by a test in which the phosphor layer in area of 102 mm long and 76 mm wide was irradiated with about 0.5-mA cathode rays continuously for 1000 hours. A ratio of the luminance measured after this test to the initial luminance was defined as an index of luminance degradation.

The resolution was further evaluated in detail by displaying high-resolution images as in high definition imaging.

The projection television imaging device of Embodiment 4 showed a higher factor, that is, higher resolution than the conventional device of the same type. It also showed luminance and luminance degradation equal to or better than the conventional one. This proved that an imaging device of high resolution and high luminance producing good-quality images was obtained by the present invention.

Embodiment 5

A projection television imaging device having a layer of the phosphors according to the present invention as a green emitting phosphor layer for image display was prepared.

Initially, a 18-cm projection tube for green images according to the present invention was prepared by the procedure of Embodiment 3. The projection television imaging device was then prepared using the projection tube for green images in combination with a projection tube for blue images having a phosphor layer comprising a ZnS:Ag, Al phosphor, and a projection tube for red images having a phosphor layer comprising a $Y_2O_3$:Eu phosphor. The device configuration and the method of measurement for the device properties are the same as described in Embodiment 4.

The projection television imaging device of Embodiment 5 showed a higher factor, that is, higher resolution than the conventional equivalent. It also showed equal to or better factors in luminance and luminance degradation than the conventional one. In particular, it showed good results in color and image quality in the evaluation in combination of the three colors. This proved that an imaging device of high resolution and high luminance producing good-quality images was obtained by the present invention.

Measurements of the light emission properties on other projection television imaging devices using cathode-ray tubes comprising other phosphor layers comprising ZnS containing phosphors as projection tube for blue images showed the same results as above. Likewise, the same results as above were obtained in measurements of the light emission properties on other projection television imaging devices using cathode-ray tubes comprising other phosphor layers comprising at least one of $Y_2O_3$ phosphor and $Y_2O_2S$ phosphor as projection tube for red images. By using these tubes in combination, imaging devices producing good-quality images were obtained.

Embodiment 6

Initially, a 18-cm projection tube for green images was prepared using a phosphor layer comprising a mixture of a $Y_{2-x-y}Tb_xSc_ySiO_5$ phosphor with a $Zn_2SiO_4$:Mn phosphor as a green emitting phosphor layer for image display. A projection television imaging device was then prepared using the projection tube for green images according to the present invention in combination with a projection tube for blue images and a projection tube for red images. The device configuration and the method of measurement for the device properties are the same as described in Embodiment 4.

As the ratio in weight of the $Zn_2SiO_4$:Mn phosphor to the total phosphors in the above phosphor mixture layer was varied from 0 to 1, the "y" value of chromaticity on the CIE chromaticity coordinates and relative luminance were measured. In green emitting phosphors, the greater the "y" value of chromaticity, the better will be the color reproduction quality to thereby produce better images. The results show that the "y" value of chromaticity rises, indicating better color reproduction quality, with an increasing weight ratio of the $Zn_2SiO_4$:Mn phosphor. In contrast, the luminance decreases with an increasing weight ratio of the $Zn_2SiO_4$:Mn phosphor. The weight ratio of the $Zn_2SiO_4$:Mn phosphor is preferably higher for the better color reproduction, but is preferably 0.4 or less for practically applicable luminance. The phosphor mixture layers having compositions within this range can yield imaging devices with good properties.

Cathode-ray tubes were prepared using phosphor mixtures comprising the $Y_{2-x-y}Tb_xSc_ySiO_5$ phosphor in combination with, instead of the $Zn_2SiO_4$:Mn phosphor, one or more other phosphors emitting light of different colors from that of the $Y_{2-x-y}Tb_xSc_ySiO_5$ phosphor, such as LaOCl:Tb phosphor, $InBO_3$:Tb phosphor, or ZnS phosphor. Measurements were made on these cathode-ray tubes and yielded the same results as above.

Embodiment 7

Initially, a 18-cm projection tube for green images was prepared using a phosphor layer comprising a mixture of a $Y_{2-x-y}Tb_xSc_ySiO_5$ phosphor with $Y_3(Al, Ga)_5O_{12}$:Tb phosphor as a green emitting phosphor layer for image display. A projection television imaging device was then prepared using the projection tube for green images according to the present invention in combination with a projection tube for blue images and a projection tube for red images. The device configuration and the method of measurement for the device properties are the same as in Embodiment 4.

As the ratio in weight of the $Y_3(Al, Ga)_5O_{12}$:Tb phosphor to the total phosphors in the above phosphor mixture layer was varied from 0 to 1, the "y" value of chromaticity on the CIE chromaticity coordinates, relative luminance, and luminance degradation were measured. The results show that the relative luminance increases and the luminance degradation decreases, but the "y" value of chromaticity decreases with an increasing weight ratio of the $Y_3(Al, Ga)_5O_{12}$:Tb phosphor. The weight ratio of the $Y_3(Al, Ga)_5O_{12}$:Tb phosphor is preferably 0.6 or less for practically applicable chromaticity. The phosphor mixture layers having compositions within this range can yield imaging devices with good properties such as high luminance and less luminance degradation.

Cathode-ray tubes were prepared using phosphor mixtures comprising the $Y_{2-x-y}Tb_xSc_ySiO_5$ phosphor in combination with, instead of the $Y_3(Al, Ga)_5O_{12}$:Tb phosphor, one or more other phosphors showing different luminance or luminance degradation from those of the $Y_{2-x-y}Tb_xSc_ySiO_5$ phosphor. Measurements were made on these cathode-ray tubes and yielded the same results as above.

Embodiment 8

Figure 10:
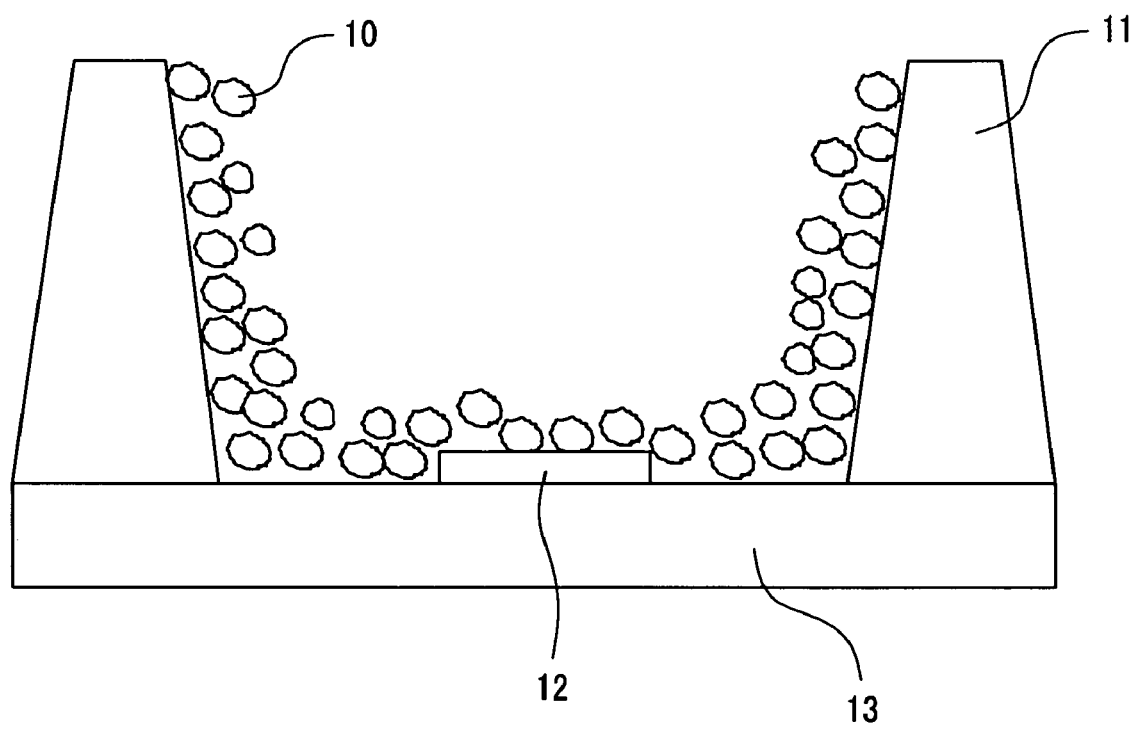
FIG. 10 is a view schematically illustrating the cell structure of a plasma display panel as a further embodiment of the present invention.

A phosphor layer having the configuration according to the present invention was applied to a plasma display panel (PDP). FIG. 10 is a sectional view schematically illustrating the cell structure of the plasma display panel. FIG. 11 shows the structure of the plasma display panel when disassembled. FIGS. 10 and 11 illustrate a phosphor 10; a separating wall 11; an address electrode 12; a back substrate glass 13; a front substrate glass 14; a dielectric layer 15; a protect layer (MgO) 16; a sustain electrode 17; a green emitting phosphor layer 18; a red emitting phosphor layer 19; and a blue emitting phosphor layer 20.

The measurements of PDPs comprising other phosphors showed further satisfactory results as shown in Embodiment 8 when a Tb—Ce-containing phosphor represented by $Y_{2-x-y}(Ce, Tb_xSc_ySiO_5$ according to the present invention was used instead of the $Y_{2-x-y}Tb_xSc_ySiO_5$ phosphor.

The device properties of the PDPs of Embodiment 8 were measured to find that the PDPs according to the invention had higher luminance than the conventional one and produced images of equivalent or higher quality. Thus, the present invention can provide imaging devices showing high luminance and producing good-quality images.

Embodiment 9

Figure 12:
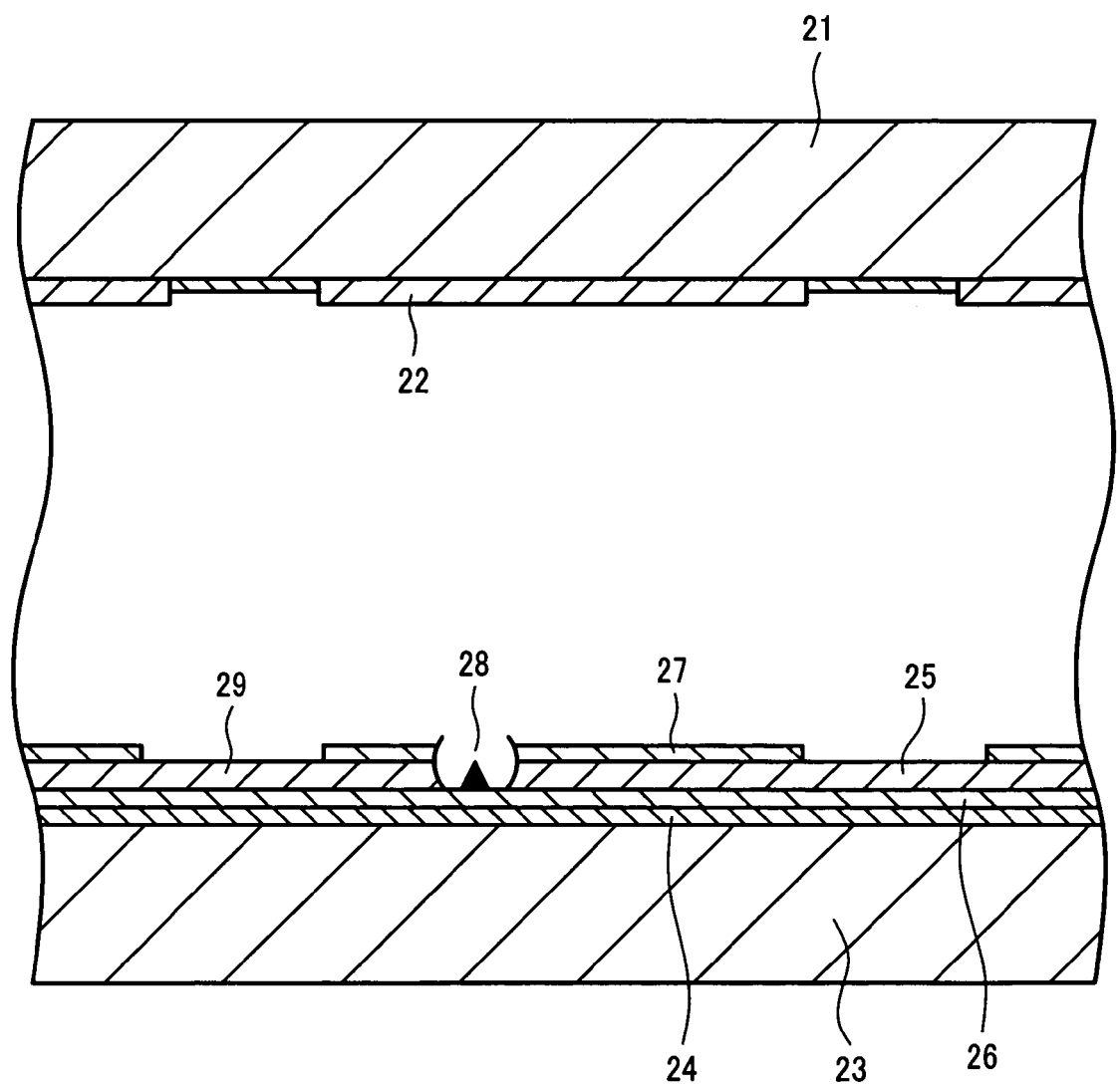
FIG. 12 is a view schematically illustrating the cell structure of a field-emitter display panel as another embodiment of the present invention.

A phosphor layer having a configuration according to the present invention was applied to a field-emitter display (FED) that uses low-energy electron beams for exciting the phosphors. FIG. 12 is a sectional view depicting the cell structure of the field-emitter display. FIG. 12 illustrates a face plate 21; a phosphor layer 22; a rear plate 23; a cathode 24; a resistance layer 25; an insulation layer 26; a gate 27; a coned metal 28; and a field emitting cathode 29.

The device properties of the FED of Embodiment 8 were measured to find that the thus-configured FED according to the invention had higher luminance than the conventional one and produced images of equivalent or higher quality. Thus, the present invention can provide imaging devices showing high luminance and producing good-quality images.

Embodiment 10

Figure 13:
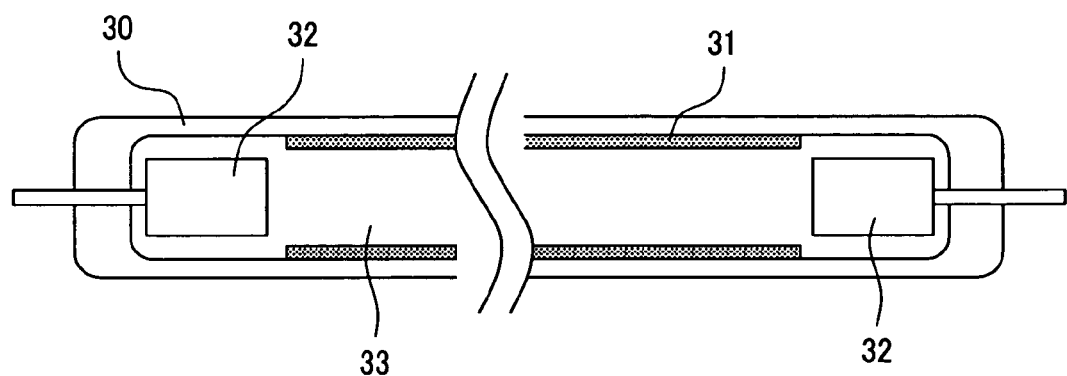
FIG. 13 is a view schematically illustrating the structure of a cold cathode fluorescent lamp (CCFL) for use in a liquid crystal display as yet another embodiment of the present invention.
Figure 14:
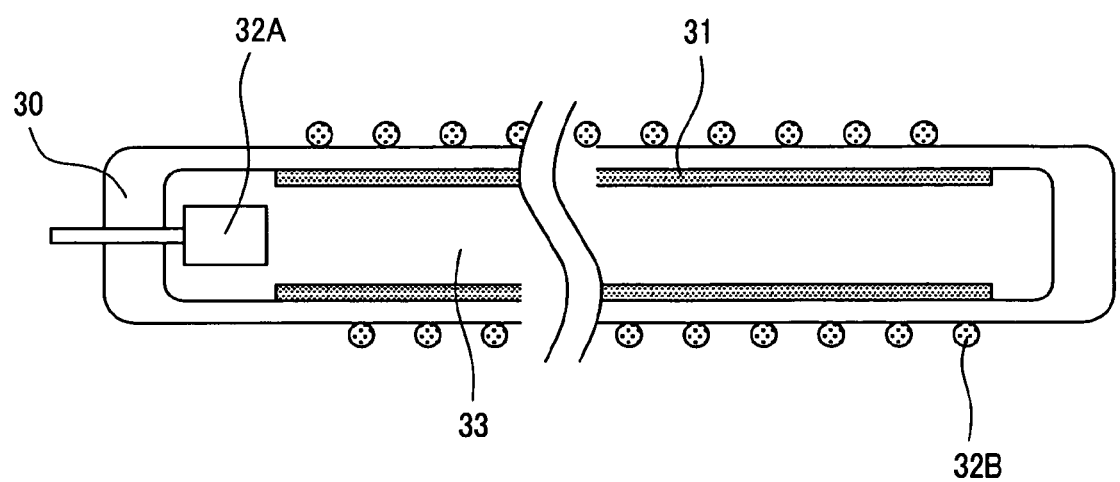
FIG. 14 is a view schematically illustrating the structure of a rare-gas lamp for use in a liquid crystal display as a further embodiment of the present invention.
Figure 15:
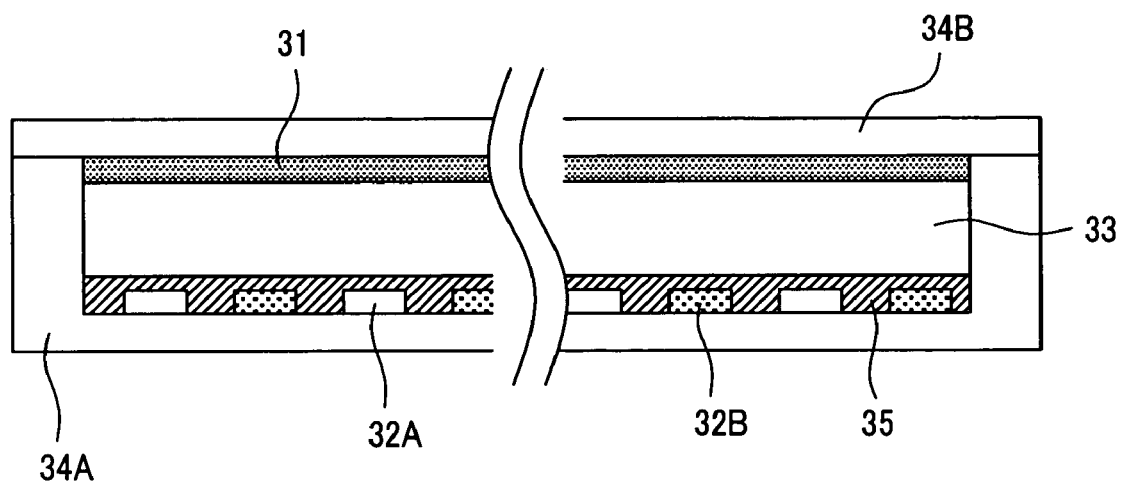
FIG. 15 is a view schematically illustrating the structure of a flat backlight for use in a liquid crystal display as another embodiment of the present invention.

A phosphor layer having a configuration according to the present invention was applied to a backlight of a liquid crystal display. FIG. 13 schematically illustrates the configuration of a cold cathode-ray fluorescent lamp (CCFL) used for the backlight. FIG. 14 is a schematic diagram of a rare gas (xenon) lamp used as a backlight having another configuration according to the present invention. FIG. 15 is a schematic diagram of a flat (xenon) lamp used as a backlight having yet another configuration according to the present invention. FIGS. 13, 14, and 15 illustrate a glass tube 30; a phosphor 31; an electrode 32; a discharge medium 33; a closed box 34 (a back panel 34A and a front panel 34B); and a dielectric 35.

A phosphor layer according to the present invention was used as a phosphor layer of these backlights. The phosphor layer further contained $Y_2O_3$:Eu phosphor and $BaMgAl_{10}O_{17}$:Eu phosphor in addition to a $Y_{2-x-y}Tb_xSc_ySiO_5$ phosphor to thereby emit white light. In addition, backlights having phosphor layers comprising at least one of $LaPO_4$:Tb, Ce phosphor and a so-called SCA:Eu phosphor instead of or in addition to the $Y_2O_3$:Eu phosphor and/or $BaMgAl_{10}O_{17}$:Eu phosphor.

Figure 16:
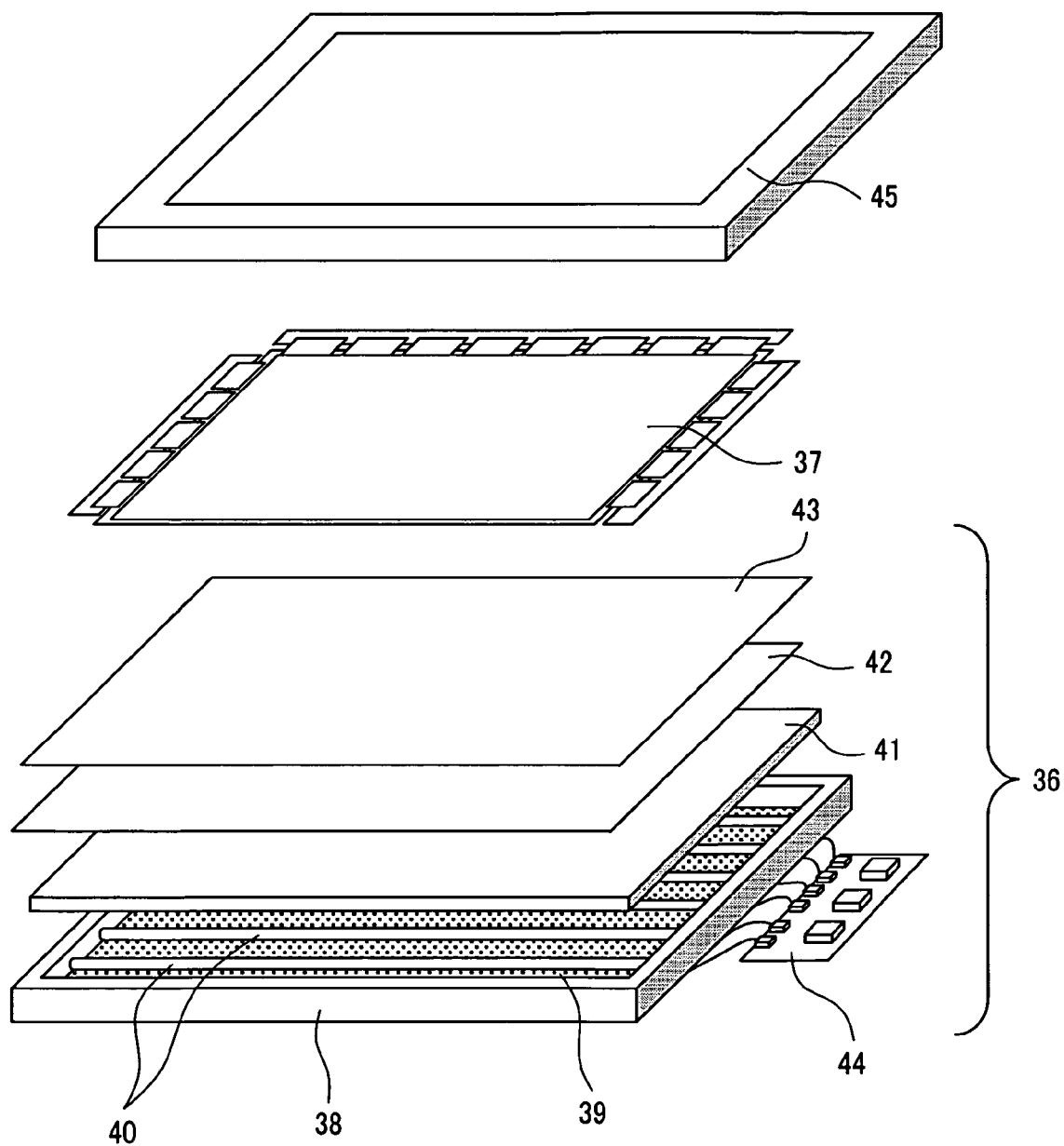
FIG. 16 is an exploded perspective view schematically illustrating the structure of a liquid crystal display as yet another embodiment of the present invention.

Using these backlights, liquid crystal displays were prepared. FIG. 16 is an exploded perspective view schematically illustrating the structure of the liquid crystal display in which a cold cathode-ray tube was used. FIG. 16 illustrates a backlight unit 36; a liquid crystal display panel 37; a flame (bottom) 38; a reflector 39; a white light source 40 (ex. CCFL); a diffuser plate 41; a prism sheet 42; a reflective polarizer 43; an inverter 44; and a frame (upper) 45.

The device properties of the liquid crystal displays of Embodiment 10 were measured to find that the thus-configured liquid crystal displays according to the invention had higher luminance than the conventional equivalents and produced images of equivalent or higher quality. Thus, the present invention can provide imaging devices showing high luminance and producing good-quality images.

The measurements of liquid crystal displays comprising other phosphors showed further satisfactory results as shown in Embodiment 10 when a Tb-Ce-containing phosphor represented by $Y_{2-x-y}Tb_xSc_ySiO_5$ according to the present invention was used instead of the $Y_{2-x-y}Tb_xSc_ySiO_5$ phosphor.

Sufficient advantages can be obtained according to the configurations of the present invention regardless of the type of light source. Sufficient advantages can be obtained in, for example, hot cathode fluorescent lamps (HCFLs). The present invention can also be applied not only to backlights but also to light sources for side lighting or front projection.

According to the present invention, liquid crystal displays showing higher luminance than conventional equivalents and producing good-quality images can be obtained.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging device at least comprising:
a phosphor layer arranged on a substrate; and
an excitation device serving to apply an excitation energy to the phosphor layer based on image information;
wherein the phosphor layer has a thickness of no greater than 40 μm and the phosphor layer at least partially comprises at least one phosphor having a composition represented by a chemical formula of:

$$Y_{2-x-y}Ln_xSc_ySiO_5,$$

wherein Ln is at least one element selected from Tb and Ce, and "x" and "y" are atomic ratios and satisfy the following conditions: $0<x\leq1$ and $0<y\leq1$; and
wherein the at least one phosphor shows a strongest diffraction peak at a diffraction angle $2\theta$ of $30.65°$ to $30.9°$ in X-ray diffraction.

2. An imaging device according to claim 1, wherein the atomic ratio "y" in the chemical formula of the at least one phosphor further satisfies the following condition: $0.09<y\leq0.3$.

3. An imaging device according to claim 1, wherein the phosphor layer has a thickness in a range of 10 μm to 30 μm.

4. An imaging device according to claim 1, wherein the phosphor layer has a thickness in a range of 10 μm to 21 μm.

5. An imaging device according to claim 1, wherein the atomic ratio "y" in the chemical formula of the at least one phosphor further satisfies the following condition: $0.2<y\leq0.3$.

6. An imaging device according to claim 1, wherein the at least one phosphor shows a strongest diffraction peak at diffraction angle $2\theta$ of $30.7°$ to $30.8°$ in X-ray diffraction.

7. An imaging device according to claim 1, wherein the at least one phosphor has a full width at half maximum of a strongest diffraction peak in terms of a diffraction angle $2\theta$ of not greater than $0.15°$.

8. An imaging device according to claim 1, wherein the at least one phosphor is a fired product of a mixture of a compound comprising at least Y, Sc, and Tb with a compound comprising Si.

9. An imaging device according to claim 1, wherein the at least one phosphor is a fired product of a compound comprising at least Y, Sc, Tb, and Si.

10. An imaging device according to claim 1, wherein the phosphor layer in addition to the at least one phosphor further comprises at least one other phosphor.

11. An imaging device according to claim 10, wherein the at least one other phosphor comprises at least one of $Zn_2SiO_4$:Mn phosphor; LaOCl:Tb phosphor; $InBO_3$:Tb phosphor; ZnS phosphor; and $Y_3(Al, Ga)_5O_{12}$:Tb phosphor.

12. An imaging device according to claim 1,
wherein the imaging device has the function of displaying color images by the action of three phosphor layers including a red emitting phosphor layer, a blue emitting phosphor layer, and a green emitting phosphor layer, and
wherein the green emitting phosphor layer has the thickness of no greater than 40 μm or less and comprises the at least one phosphor.

13. An imaging device according to claim 1,
wherein the imaging device has the function of displaying color images by the action of three phosphor layers including a red emitting phosphor layer, a blue emitting phosphor layer, and a green emitting phosphor layer;
wherein the red emitting phosphor layer at least partially comprises at least one of a phosphor comprising $Y_2O_3$ and a phosphor comprising $Y_2O_2S$;
wherein the blue emitting phosphor layer at least partially comprises a phosphor comprising ZnS; and
wherein the green emitting phosphor layer has the thickness of no greater than 40 μm or less and comprises the at least one phosphor.

14. An imaging device according to claim 1, as a projection television comprising:
a projection cathode-ray tube comprising the phosphor layer on its face plate, and an electron emitter serving to apply electron beams to the phosphor layer based on image information; and
a screen serving to display an image projected by the projection cathode-ray tube.

15. An imaging device according to claim 1, wherein the imaging device comprises a flat display panel.

16. An imaging device according to claim 15, wherein the excitation device comprises:
a device serving to generate plasma and comprising a gas discharge electrode and a rare gas to be discharged; and
a device serving to apply light to the phosphor layer, the light being generated as a result of discharge of plasma generated by the plasma discharge device based on the image information.

17. An imaging device according to claim 15, wherein the excitation device comprises:
a field-emission electron emitter arranged so as to face the phosphor layer on the substrate; and
a device serving to apply electron beams as the excitation energy to the phosphor layer, the electron beams being generated by the field-emission electron emitter based on the image information.

18. An imaging device as a projection color television comprising:
three projection cathode-ray tubes including a projection cathode-ray tube for red signals, a projection cathode-ray tube for green signals, and a projection cathode-ray tube for blue signals, each of the projection cathode-ray tubes comprising a phosphor layer on its face plate, and an electron emitter serving to apply electron beams to the phosphor layer based on image information; and
a screen serving to display images projected from the projection cathode-ray tubes;
wherein the phosphor layer on the face plate of the projection cathode-ray tube for green signals has a thickness of no greater than 40 μm and comprises at least one phosphor having a composition represented by a chemical formula of:

$$Y_{2-x-y}Ln_xSc_ySiO_5,$$

wherein Ln is at least one element selected from Tb and Ce, and "x" and "y" are atomic ratios and satisfy the following conditions: $0<x\leq1$ and $0<y\leq1$; and wherein the at least one phosphor shows a strongest diffraction peak at a diffraction angle 2θ of 30.65° to 30.9° in X-ray diffraction.

19. An imaging device comprising:
a liquid crystal panel; and
a light source comprising a phosphor layer,
wherein the phosphor layer has a thickness of no greater than 40 μm and comprises at least one phosphor having a composition represented by a chemical formula of:

$$Y_{2-x-y}Ln_xSc_ySiO_5,$$

wherein Ln is at least one element selected from Tb and Ce, and "x" and "y" are atomic ratios and satisfy the following conditions: $0<x\leq1$ and $0<y\leq1$; and wherein the at least one phosphor shows a strongest diffraction peak at a diffraction angle 2θ of 30.65° to 30.9° in X-ray diffraction.

20. An imaging device according to claim 19, comprising:
a liquid crystal panel; and
a white-emitting cold cathode fluorescent lamp as the light source, the fluorescent lamp comprising the phosphor layer including a red emitting phosphor, a green emitting phosphor, and a blue emitting phosphor, the fluorescent lamp serving as a backlight of the liquid crystal panel, wherein the phosphor layer has the thickness of no greater than 40 μm; and wherein the green emitting phosphor comprises the at least one phosphor.

21. A fluorescent lamp comprising a phosphor layer,
wherein the phosphor layer has a thickness of no greater than 40 μm and comprises at least one phosphor having a composition represented by a chemical formula of:

$$Y_{2-x-y}Ln_xSc_ySiO_5,$$

wherein Ln is at least one element selected from Tb and Ce, and "x" and "y" are atomic ratios and satisfy the following conditions: $0<x\leq1$ and $0<y\leq1$; and wherein the at least one phosphor shows a strongest diffraction peak at a diffraction angle 2θ of 30.65° to 30.9° in X-ray diffraction.

22. A fluorescent lamp according to claim 21, as a white-emitting cold cathode fluorescent lamp comprising the phosphor layer comprising a red emitting phosphor, a green emitting phosphor, and a blue emitting phosphor;

wherein the green emitting phosphor is at least one phosphor.

* * * * *